(12) United States Patent
Lesh

(10) Patent No.: US 10,511,800 B2
(45) Date of Patent: *Dec. 17, 2019

(54) VIDEO PREVIEW DURING TRICK PLAY

(71) Applicant: COMCAST CABLE COMMUNICATIONS MANAGEMENT, LLC, Philadelphia, PA (US)

(72) Inventor: Joseph Lesh, Seattle, WA (US)

(73) Assignee: COMCAST CABLE COMMUNICATIONS MANAGEMENT, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/877,130

(22) Filed: Jan. 22, 2018

(65) Prior Publication Data

US 2018/0376101 A1 Dec. 27, 2018

Related U.S. Application Data

(63) Continuation of application No. 14/562,142, filed on Dec. 5, 2014, now Pat. No. 9,918,040.

(51) Int. Cl.
*H04N 5/783* (2006.01)
*H04N 9/82* (2006.01)
*H04N 5/93* (2006.01)
*G11B 27/28* (2006.01)
*G11B 27/34* (2006.01)
(Continued)

(52) U.S. Cl.
CPC .......... *H04N 5/783* (2013.01); *G11B 27/005* (2013.01); *G11B 27/105* (2013.01); *G11B 27/28* (2013.01); *G11B 27/34* (2013.01); *H04N 5/93* (2013.01); *H04N 9/8205* (2013.01)

(58) Field of Classification Search
USPC .................................................. 386/343–352
See application file for complete search history.

(56) References Cited

U.S. PATENT DOCUMENTS 6,292,589 B1 9/2001 Chow et al.
9,918,040 B2 3/2018 Lesh
(Continued)

FOREIGN PATENT DOCUMENTS

WO WO-2005/025205 A1 3/2005

OTHER PUBLICATIONS

Klein, Allison W., "Video Mosaics", the Association for Computing Machinery, 9 pages (2002).
(Continued)

*Primary Examiner* — Hung Q Dang
(74) *Attorney, Agent, or Firm* — Ballard Spahr LLP

(57) ABSTRACT

Methods and systems are described for displaying a thumbnail preview of video content. In an aspect, one or more mosaic images made up of thumbnails corresponding to frames of the video content at multiple time points can be loaded into the system or created by the methods described. In an aspect, the selected thumbnail, as well as any other thumbnails, can be selected in response to receiving a command (e.g., trick play request) from the viewer. The command can dictate the direction from the selected thumbnail that the next thumbnails will be selected. The command can also dictate the frequency with which thumbnails will be selected from the mosaic image. In an aspect, frames comprised of thumbnails can be encoded to create the video content.

24 Claims, 11 Drawing Sheets

(51) Int. Cl.
*G11B 27/10* (2006.01)
*G11B 27/00* (2006.01)

(56) References Cited

U.S. PATENT DOCUMENTS

| | | |
|---|---|---|
| 2004/0032968 A1 | 2/2004 | Andrew et al. |
| 2005/0074172 A1 | 4/2005 | Kodama |
| 2005/0100319 A1 | 5/2005 | Saed |
| 2006/0120624 A1 | 6/2006 | Jojic et al. |
| 2008/0159639 A1 | 7/2008 | Dvir et al. |
| 2014/0002504 A1 | 1/2014 | Farmer et al. |
| 2014/0310601 A1 | 10/2014 | Matejka et al. |
| 2016/0165173 A1 | 6/2016 | Lesh |

OTHER PUBLICATIONS

U.S. Appl. No. 14/562,142 (U.S. Pat. No. 9,918,040), filed Dec. 5, 2014 (Mar. 13, 2018), Joseph Lesh.

FIG. 4

| 0.jpg 0:03 402 | 1.jpg 0:06 404 | 2.jpg 0:09 406 | 3.jpg 0:12 408 | 4.jpg 0:15 410 |
| --- | --- | --- | --- | --- |
| 5.jpg 0:18 412 | 6.jpg 0:21 414 | 7.jpg 0:24 416 | 8.jpg 0:27 418 | 9.jpg 0:30 420 |
| 10.jpg 0:33 422 | 11.jpg 0:36 424 | 12.jpg 0:39 426 | 13.jpg 0:42 428 | 14.jpg 0:45 430 |
| 15.jpg 0:48 432 | 16.jpg 0:51 434 | 17.jpg 0:54 436 | 18.jpg 0:57 438 | 19.jpg 0:60 440 |

400

VIDEO PREVIEW DURING TRICK PLAY

CROSS-REFERENCE TO RELATED APPLICATION

This application is a continuation of U.S. patent application Ser. No. 14/562,142, filed Dec. 5, 2014, which is hereby incorporated by reference in its entirety.

BACKGROUND

A media player can present a thumbnail to a viewer that represents a time point in video content that is being rendered. However, the thumbnail is generated from a single image. Multiple images will therefore need to be accessed in the event the media player needs to display multiple thumbnails. Loading multiple images to display multiple thumbnails will cause the media player to experience performance issues. These and other shortcomings of the prior art are addressed by the present disclosure.

SUMMARY

It is to be understood that both the following general description and the following detailed description are exemplary and explanatory only and are not restrictive. Methods and systems are described for displaying a thumbnail preview of video content. In an aspect, one or more mosaic images made up of thumbnails corresponding to frames of the video content at multiple time points can be loaded into the system. In an aspect, an image can be selected for use as a thumbnail from within the mosaic image by selecting a portion of the mosaic image corresponding to a time and utilizing the selected portion of the mosaic image as a selected thumbnail. In an aspect, the selected thumbnail, as well as any other thumbnails, can be selected in response to receiving a command (e.g., trick play request) from the viewer. The command can comprise fast forward, rewind, skip, hover over, and the like. In another aspect, video content, and portions thereof, can be recreated using the mosaic image. In an aspect, the selected thumbnail, as well as a predetermined number of the subsequent or previous thumbnails can comprise frames of the video content. In an aspect, the selected thumbnail and every $N^{th}$ subsequent or previous thumbnail until either a terminal thumbnail is reached or exceeded or a predetermined number of thumbnails can comprise frames of the video content. In an aspect, the frames comprised of thumbnails can be encoded to create the video content.

In an aspect, methods and systems are described whereby a trick play request can be received. A video frame can be determined according to the trick play request, and at least one image associated with the video frame can be retrieved from a mosaic image and outputted for display. The mosaic image can comprise a plurality of images.

In an aspect, methods and systems are described whereby a trick play request can be received. A time point can be determined according to a timespan associated with the trick play request, and at least one image can be retrieved from a mosaic image and outputted for display, based on the time point and a user preference.

In an aspect, methods and systems are described whereby a plurality of images can be extracted from a video content item. A mosaic image can be generated using the plurality of images wherein one or more of the plurality of images can be later retrieved from the mosaic image according to a user preference.

In an aspect, methods and systems are described whereby a mosaic image comprised of a plurality of images can be received. A logical temporal sequence can be determined for at least a portion of the plurality of images based on a request and rendered as a video.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 4 is a diagram of an exemplary mosaic image;

DETAILED DESCRIPTION

Figure 1:
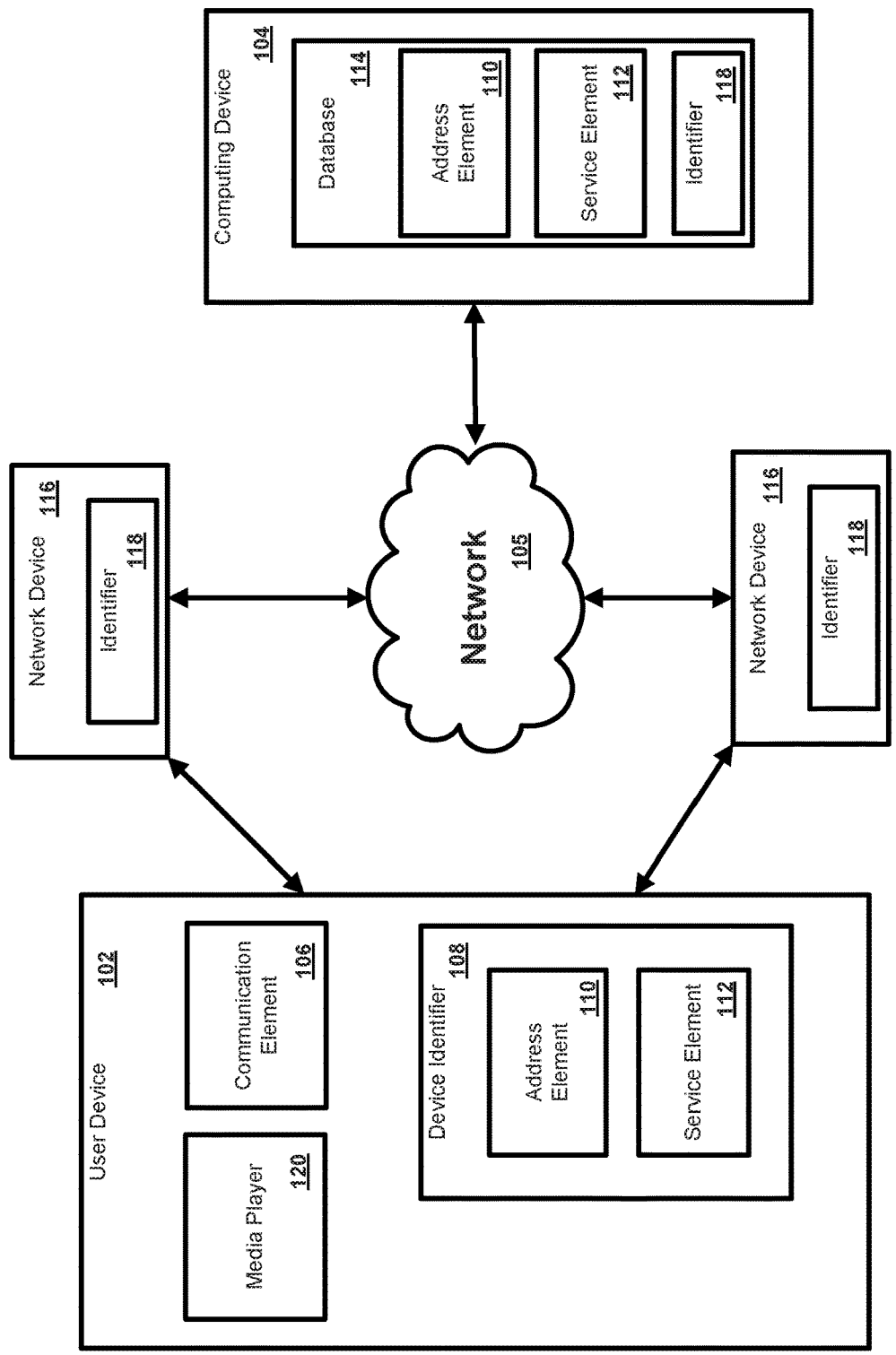
FIG. 1 is a block diagram of an exemplary system and network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to providing a plurality of thumbnails related to video content in response to a trick play request from a viewer. In an aspect, a mosaic image can be supplied with the video content at the time that the video content is retrieved, accessed, or played. In another aspect, the mosaic image can be created dynamically when the video content is retrieved or played. The mosaic image can comprise the plurality of thumbnails related to the video content. In an aspect, each of the plurality of thumbnails can have the same height and/or the same width. Each of the plurality of thumbnails can represent the same time interval, for example, every 3 seconds or every other minute. In an aspect, the mosaic image can be created by dividing the total running time of the video content by the number of thumbnails to be in the mosaic image to arrive at an interval and selecting a frame at each interval. In an aspect, one of the plurality of thumbnails can be selected from within the mosaic image corresponding to a specific time point.

In another aspect, video content, and portions thereof, can be recreated using the mosaic image. For example, each of the thumbnails can be used to create the video content, starting at the first thumbnail in the mosaic image and ending at the last thumbnail in the mosaic image. In an aspect, one of the plurality of thumbnails can be selected as a first frame of the video content according to the systems and methods described herein. In an aspect, the selected thumbnail, as well as a predetermined number of the subsequent or previous thumbnails can comprise frames of the video content. In an aspect, the selected thumbnail and every $N^{th}$ subsequent thumbnail until a terminal thumbnail is reached or exceeded can comprise frames of the video content. In an aspect, the selected thumbnail and every $N^{th}$ subsequent thumbnail until a predetermined number of thumbnails is reached can comprise frames of the video content. In an aspect, the selected thumbnail and every $N^{th}$ previous thumbnail until a terminal thumbnail is reached or exceeded can comprise frames of the video content. In an aspect, the selected thumbnail and every $N^{th}$ previous thumbnail until a predetermined number of thumbnails is reached can comprise frames of the video content. In an aspect, the frames comprised of thumbnails can be encoded to create the video content.

In one aspect of the disclosure, a system can be configured to provide services such as network-related services to a user device. FIG. 1 illustrates various aspects of an exemplary environment in which the present methods and systems can operate. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

The present disclosure is relevant to systems and methods for providing video content to a user device, for example, a user device such as a computer, tablet, mobile device, communications terminal, or the like. In an aspect, one or more network devices can be configured to provide the video content to one or more user devices, such as user devices located at or near a premises. The one or more user devices can comprise a media player 120 for displaying the video content. The media player 120 can be configured to display thumbnails of the video content retrieved from a mosaic image in response to a command (e.g., trick play) from a viewer.

The network and system can comprise a user device 102 in communication with a computing device 104 such as a server, for example. The computing device 104 can be disposed locally or remotely relative to the user device 102. As an example, the user device 102 and the computing device 104 can be in communication via a private and/or public network 105 such as the Internet or a local area network. Other forms of communications can be used such as wired and wireless telecommunication channels, for example.

In an aspect, the user device 102 can be an electronic device such as a computer, a smartphone, a laptop, a tablet, a set top box, a display device, or other device capable of communicating with the computing device 104. As an example, the user device 102 can comprise a communication element 106 for providing an interface to a user to interact with the user device 102 and/or the computing device 104. The communication element 106 can be any interface for presenting and/or receiving information to/from the user, such as user feedback. An example interface may be communication interface such as a web browser (e.g., Internet Explorer®, Mozilla Firefox®, Google Chrome®, Safari®, or the like). Other software, hardware, and/or interfaces can be used to provide communication between the user and one or more of the user device 102 and the computing device 104. As an example, the communication element 106 can request or query various files from a local source and/or a remote source. As a further example, the communication element 106 can transmit data to a local or remote device such as the computing device 104.

In an aspect, the user device 102 can be associated with a user identifier or device identifier 108. As an example, the device identifier 108 can be any identifier, token, character, string, or the like, for differentiating one user or user device (e.g., user device 102) from another user or user device. In a further aspect, the device identifier 108 can identify a user or user device as belonging to a particular class of users or user devices. As a further example, the device identifier 108 can comprise information relating to the user device such as a manufacturer, a model or type of device, a service provider associated with the user device 102, a state of the user device 102, a locator, and/or a label or classifier. Other information can be represented by the device identifier 108.

In an aspect, the device identifier 108 can comprise an address element 110 and a service element 112. In an aspect, the address element 110 can comprise or provide an internet protocol address, a network address, a media access control (MAC) address, an Internet address, or the like. As an example, the address element 110 can be relied upon to establish a communication session between the user device 102 and the computing device 104 or other devices and/or networks. As a further example, the address element 110 can be used as an identifier or locator of the user device 102. In an aspect, the address element 110 can be persistent for a particular network.

In an aspect, the service element 112 can comprise an identification of a service provider associated with the user device 102 and/or with the class of user device 102. The class of the user device 102 can be related to a type of device, capability of device, type of service being provided, and/or a level of service (e.g., business class, service tier, service package, etc.). As an example, the service element 112 can comprise information relating to or provided by a communication service provider (e.g., Internet service provider) that is providing or enabling data flow such as communication services to the user device 102. As a further example, the service element 112 can comprise information relating to a preferred service provider for one or more particular services relating to the user device 102. In an aspect, the address element 110 can be used to identify or retrieve data from the service element 112, or vise versa. As a further example, one or more of the address element 110 and the service element 112 can be stored remotely from the user device 102 and retrieved by one or more devices such as the user device 102 and the computing device 104. Other information can be represented by the service element 112.

In an aspect, the computing device 104 can be a server for communicating with the user device 102. As an example, the computing device 104 can communicate with the user device 102 for providing data and/or services. As an example, the computing device 104 can provide services such as network (e.g., Internet) connectivity, network printing, media management (e.g., media server), content services, streaming services, broadband services, or other network-related services. In an aspect, the computing device 104 can allow the user device 102 to interact with remote resources such as data, devices, and files. As an example, the computing device 104 can be configured as (or disposed at) a central location (e.g., a headend, or processing facility), which can receive content (e.g., data, input programming) from multiple sources. The computing device 104 can combine the content from the multiple sources and can distribute the content to user (e.g., subscriber) locations via a distribution system.

In an aspect, the computing device 104 can manage the communication between the user device 102 and a database 114 for sending and receiving data therebetween. As an example, the database 114 can store a plurality of files (e.g., web pages), user identifiers or records, or other information. For example, the database 114 can store one or more mosaic files. An exemplary mosaic file is illustrated in FIG. 4. A mosaic file comprises a mosaic image, wherein the mosaic image comprises a plurality of thumbnail images related to content played on media player 120. In an aspect, the mosaic file can be created by associating time points in the content played with an image of a frame of the content at the associated time points. In an aspect, time points can be determined from metadata in the content played. In an aspect, time points can be embedded in the mosaic file. See the description of FIG. 4 for more details on creating the mosaic file. As a further example, the user device 102 can request and/or retrieve a file from the database 114. In an aspect, the database 114 can store information relating to the user device 102 such as the address element 110 and/or the service element 112. As an example, the computing device 104 can obtain the device identifier 108 from the user device 102 and retrieve information from the database 114 such as the address element 110 and/or the service elements 112. As a further example, the computing device 104 can obtain the address element 110 from the user device 102 and can retrieve the service element 112 from the database 114, or vice versa. Any information can be stored in and retrieved from the database 114. The database 114 can be disposed remotely from the computing device 104 and accessed via direct or indirect connection. The database 114 can be integrated with the computing system 104 or some other device or system.

In an aspect, one or more network devices 116 can be in communication with a network such as network 105. As an example, one or more of the network devices 116 can facilitate the connection of a device, such as user device 102, to the network 105. As a further example, one or more of the network devices 116 can be configured as a wireless access point (WAP). In an aspect, one or more network devices 116 can be configured to allow one or more wireless devices to connect to a wired and/or wireless network using Wi-Fi, Bluetooth or any desired method or standard.

In an aspect, the network devices 116 can be configured as a local area network (LAN). As an example, one or more network devices 116 can comprise a dual band wireless access point. As an example, the network devices 116 can be configured with a first service set identifier (SSID) (e.g., associated with a user network or private network) to function as a local network for a particular user or users. As a further example, the network devices 116 can be configured with a second service set identifier (SSID) (e.g., associated with a public/community network or a hidden network) to function as a secondary network or redundant network for connected communication devices.

In an aspect, one or more network devices 116 can comprise an identifier 118. As an example, one or more identifiers can be or relate to an Internet Protocol (IP) Address IPV4/IPV6 or a media access control address (MAC address) or the like. As a further example, one or more identifiers 118 can be a unique identifier for facilitating communications on the physical network segment. In an aspect, each of the network devices 116 can comprise a distinct identifier 118. As an example, the identifiers 118 can be associated with a physical location of the network devices 116.

In an aspect, the user device can comprise a media player 120. The media player 120 can receive video content from a remote device, such as computing device 104 and render the received video content. In an aspect, the media player 120 can stream video content from a remote device, such as computing device 104. In an aspect, the media player 120 can cause the video content to be downloaded from a remote device, such as computing device 104, and stored locally in user device 102 for playback. In an aspect, the media player 120 can play video content from an external storage source, such as a digital video disc (DVD). In an aspect, the received video content can comprise a mosaic image, such as mosaic image 400, shown in FIG. 4. In an aspect, the media player 120 can receive a mosaic image 400 from a transmission separate from the video content transmission. In an aspect, the media player 120 can create a mosaic image. The mosaic image 400 can comprise a plurality of thumbnails. The plurality of thumbnails can each correspond to a time point in the video content. In an aspect, the media player 120 can use the mosaic image 400 to show a preview of a corresponding frame when a user activates a trick play command. In an aspect, the media player 120 can select a plurality of thumbnails from the mosaic image 400 to render as video.

Figure 2:
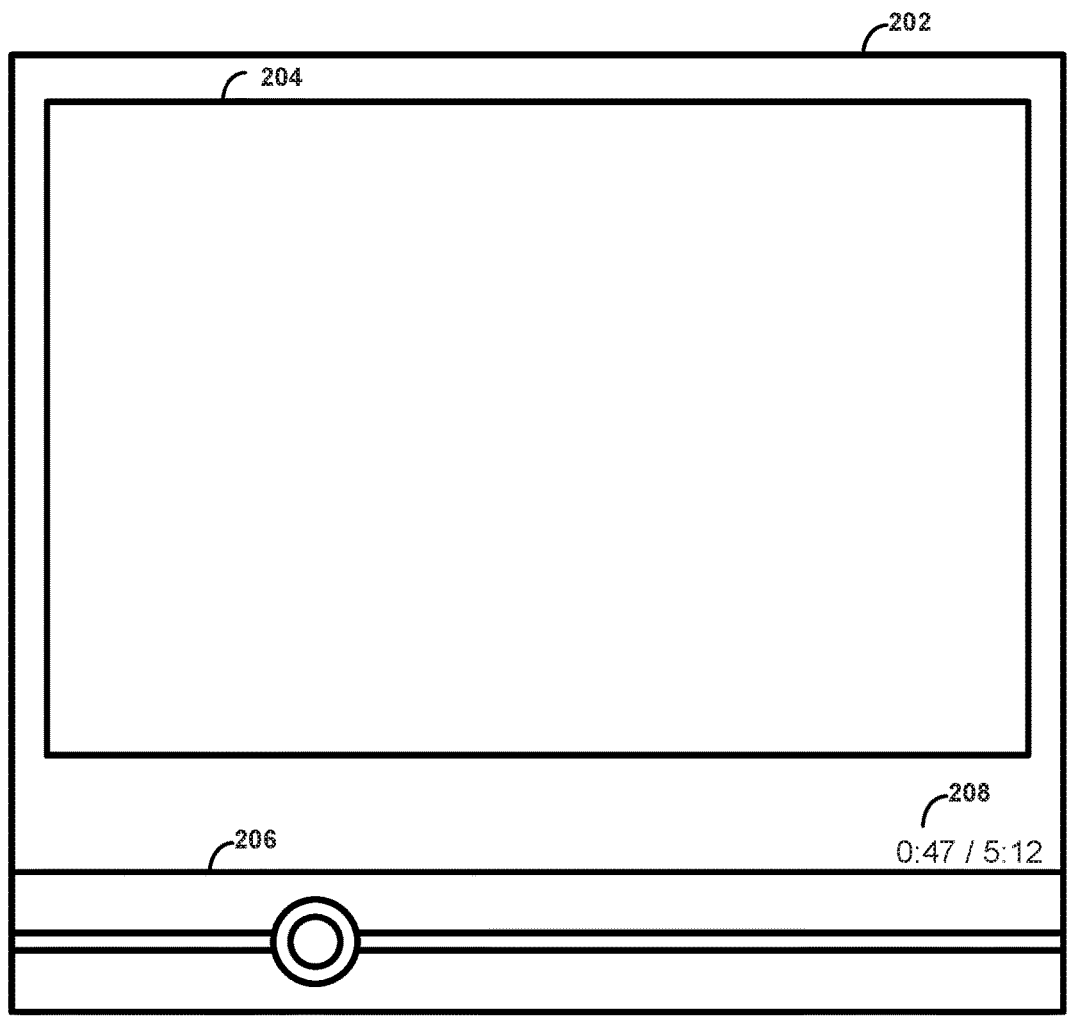
FIG. 2 is a diagram of an exemplary interface of a media player.

FIG. 2 illustrates an exemplary interface of a media player 120. Area 202 can represent a display window for the media player 120. Area 202 can comprise a window 204 for displaying video content, a scrubber 206 for selecting a time point of the video content for display, and a clock 208 for displaying a time point of the video content currently being displayed. The scrubber 206 can be used to fast forward, rewind, or skip to a particular time point of the video content. The clock 208 can display a total runtime. The clock 208 can count up (time played), count down (time remaining), or both.

Figure 3:
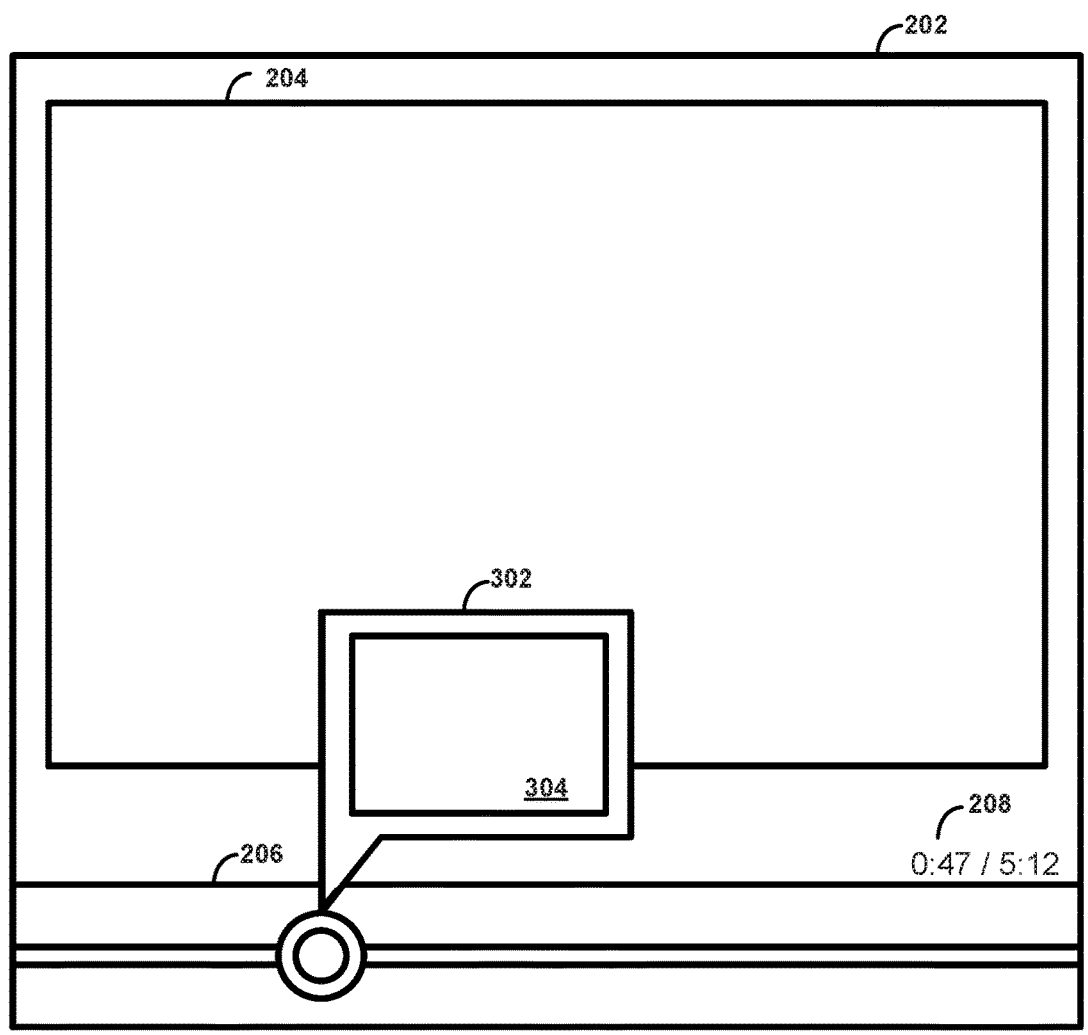
FIG. 3 is a diagram of an exemplary interface of a media player.

FIG. 3 illustrates an exemplary interface of a media player 120. FIG. 3 is similar to FIG. 2, except that a preview interface 302 appears in FIG. 3. The preview interface 302 can comprise a thumbnail display 304. The preview interface 302 can appear in response to a viewer activating a trick play function. A trick play function can be a fast forward command, a rewind command, or any command that causes the video content to display in a sequence or speed out of the ordinary. In an aspect, a trick play function can have a variable multiplier or divisor to change the speed of the trick play function. As an example, a fast forward command can have an initial multiplier of 2, and the fast forward command can further double a fast forward speed if the multiplier is increased to 4. In an aspect, a trick play function can alter a speed based on a location in content. As an example, a fast forward command can slow down a speed when a scene change is detected in content. In an aspect, slowing down a trick play function can comprise increasing a number of thumbnails displayed in the thumbnail display 104 in a given interval of content. For example, if a fast forward command is activated, a thumbnail can represent every 6 seconds of content during a scene, but a thumbnail can represent every 2 seconds of content before and after a scene change. In an aspect, speeding up a trick play function can comprise decreasing a number of thumbnails displayed in the thumbnail display 104 in a given interval of content.

FIG. 4 illustrates an exemplary mosaic image 400. In an aspect, the media player 120 can receive the mosaic image 400 at or near the time the media player 120 receives the video content for display. In an aspect, the received mosaic image 400 can be created by a creator of the video content, a host of the video content, or another third-party. In an aspect, the media player 120 can create the mosaic image 400. In an aspect, the mosaic image 400 can be stored in any format, such as JavaScript Object Notation format, for example. Creating the mosaic image 400 can comprise obtaining a predetermined number or range of numbers representing a number of thumbnails, a range of thumbnails, percentage of thumbnails, a range of percentages of thumbnails, an amount of time between thumbnails, a range of time between thumbnails, or any combination of the foregoing. The predetermined number or range of numbers can be adjustable. Creating the mosaic image 400 can comprise determining the number of thumbnails to include in the mosaic image 400, if not already obtained. Creating the mosaic image 400 can comprise determining the time intervals to include in between thumbnails, if not already included. Creating the mosaic image 400 can comprise selecting a frame at each time interval obtained or determined. In an aspect, a selected frame can be converted into a thumbnail and included in the mosaic image 400. In an aspect, a plurality of resolutions can be included in the mosaic image 400 for a selected frame. In an aspect, a plurality of sizes can be included in the mosaic image 400 for a selected frame. In an aspect, if a selected frame contains no or little information, such as a frame that is all black, a substitute frame can be selected for inclusion in the mosaic image 400. The substitute frame can be a frame adjacent to the originally selected frame.

The mosaic image 400 can comprise a plurality of images, such as thumbnails 402-440. In an aspect, the mosaic image 400 can comprise rows and columns of images, although other arrangements are contemplated. In an aspect, the sum of the widths of the images in a row, such as images 402-410, can equal the width of the mosaic image 400. In an aspect, the sum of the heights of the images in a column can equal the height of the mosaic image 400. In an aspect, the dimensions of the images can be heterogeneous. In an aspect, the dimensions of the images can be homogenous, allowing an image corresponding to a time point to be retrieved by offsets. For example, if the width of each image 402-440 in the mosaic image 400 is 300, the height of each image 402-440 in the mosaic image 400 is 240, each image 402-440 is a three second time interval, the mosaic image 400 has 5 columns of images, and the first image is at time point 0:03 second, then the column and row of the image within the mosaic image can be determined for a given time point in the video content using the following methods.

In the example, a time associated with the video content can be determined when a request is received. For instance, if the video content is at 46.906 seconds when the request is received, then the time associated with the content can be rounded to the nearest integer, or 47 seconds. Because the exemplary mosaic image 400 comprises thumbnails with associated time points in multiples of three, and 47 is not a multiple of three, a second rounding decision can be made to round 47 to the nearest multiple of three, or to 48 seconds. In another aspect, 46.906 seconds could be directly rounded to 48 seconds in one step.

In the example, the time associated with the video content when the request was received, 48 seconds, can be used to determine a target thumbnail in the mosaic image 400 to return. For instance, 48 can be divided by the three second interval to arrive at 16. The thumbnail corresponding to 0:48 seconds can be determined as the 16$^{th}$ thumbnail in the mosaic image 400. Because the first thumbnail 402 is at 0:03, and not 0:00, the 16$^{th}$ thumbnail, and not the 17$^{th}$ thumbnail, is the correct thumbnail. Also note that because computer indexes generally begin at 0, the order of the thumbnail, 16, will be decremented, resulting in 15.

In the example, the decremented order of the target thumbnail, 15, can be used to determine a position of the target thumbnail in the mosaic image 400. First, the row of the target thumbnail can be determined. Because there are five columns in the mosaic image 400, a new row will start after each fifth thumbnail. Dividing the decremented order of the thumbnail by the number of columns and ignoring the remainder will yield the row of the thumbnail (or 15/5=3.0 or row 3). Note: Row 0 comprises thumbnails 402-410; Row 1 comprises thumbnails 412-420; Row 2 comprises thumbnails 422-430; etc. Next, the column of the target thumbnail can be determined by taking the remainder (or modularly dividing) the decremented order divided by the number of columns (or 15%5=0 or column 0).

In the example, row 3 and column 0, can be used to determine the target thumbnail position in the mosaic image 400. With the row and column number determined, an origin (or top left corner) of the target thumbnail can be determined by multiplying the width of the images by computed column and the height of the images by the computed row or (0*300, 3*240) or (0, 720). The remaining corners of the target image can be computed by adding the appropriate dimensions. For instance, the top right corner of the target image can be determined by adding the width of the images to the top left corner, or (0+300, 720) or (300, 720). For instance, the bottom left corner can be determined by adding the height of the images to the top left corner, or (0, 720+240) or (0, 960). For instance, the bottom right corner can be determined by adding the height of the images to the top right corner, or (300, 720+240) or (300, 960).

In the example, image 432 can be the rectangle with corners at the above positions on the mosaic image 400. One of ordinary still in the art will realize that any other way of computing the positions of corners of a target image within the mosaic image 400 can be used. Additionally, one of ordinary skill in the art will realize that any other way of mapping an image within the mosaic image 400 to a time point in the video content can be used.

Figure 5:
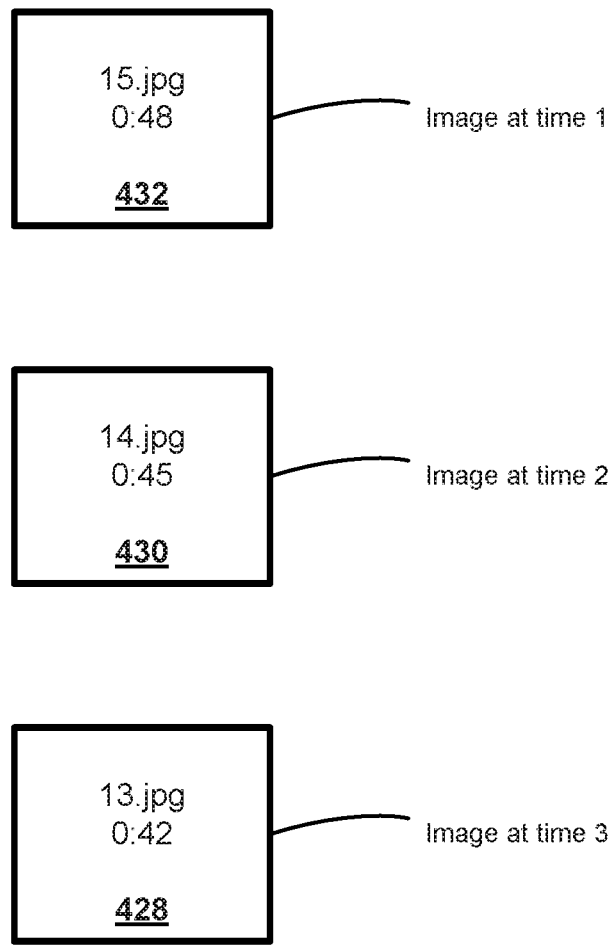
FIG. 5 is a diagram of an exemplary sequence of images associated with a trick play function.

FIG. 5 illustrates an exemplary sequence of thumbnails to be presented in connection with a trick play command. In an aspect, the trick play command can indicate a desire to skip the video content backwards, such as a rewind command. In response to receiving the trick play command, a series of thumbnails can be prepared for a preview. The series of thumbnails can begin with a first thumbnail 432 within the mosaic image 400. The first thumbnail 432 can be selected by determining a current time point in the displayed video content and determining a first thumbnail 432 based on the position of the first thumbnail 432 in the mosaic image 400. The position of the first thumbnail 432 in the mosaic image 400 can indicate a corresponding time point in the video content. For example, a viewer can activate a trick play command for skipping the video backwards 47 seconds into video content. A selection can be made that the thumbnail 432, determined to be associated with 48 seconds into the video content, should be the first of a plurality of preview thumbnails. In another aspect, a determination can be made that a thumbnail should not be shown if the video content time point associated with the thumbnail has not been shown. In such a circumstance, the thumbnail 430 associated with 45 seconds into the video content can be the first selected thumbnail.

Once the first thumbnail 432 is selected, the thumbnails to be subsequently displayed can be selected. In an aspect, in the event of a backwards trick play request, such as a rewind request, the subsequently selected thumbnail can be a thumbnail that precedes the currently selected thumbnail. In an aspect, the subsequently selected thumbnail can be the thumbnail that immediately precedes the currently selected thumbnail in the mosaic image 400, such as thumbnail 430. In an aspect, the subsequently selected thumbnail can be a number of thumbnails prior to the currently selected thumbnail, wherein the number can increase as the viewer indicates a desire to increase the speed of the backwards trick play event. For example, the subsequently selected thumbnail can be one thumbnail prior to the currently selected thumbnail. In the example, if the viewer requests that the speed of the backwards trick play event be increased by twice as fast as the current speed, then the subsequently selected thumbnail can be two thumbnails prior to the currently selected thumbnail. In the example, if the viewer then requests that the speed of the backwards trick play event be increased by twice as fast as the increased speed, then the subsequently selected thumbnail can be four thumbnails prior to the currently selected thumbnail. In an aspect, the speed of the backwards trick play event can be changed by an indication of an event in the content, such as a change in scene. In an aspect, the indication of the event in the content can be given through metadata. In an aspect, the indication of the event in the content can be given by analyzing the content displayed. In an aspect, the speed of the backwards trick play event can be altered by changing the number of thumbnails prior to the currently selected thumbnail that the subsequently selected thumbnail is selected. For example, if a viewer has caused a trick play event to display the thumbnails such that the fourth thumbnail prior to the currently selected thumbnail is the subsequently selected thumbnail, in response to detecting an event in content, such as a scene change, the trick play event can "slow down" by selecting the third, second, and/or every thumbnail prior to the currently selected thumbnail. In an example, the trick play event can "slow down" as the event in content is approached, (first, by selecting every third thumbnail prior to the currently selected thumbnail, then every second thumbnail prior to the currently selected thumbnail, and finally every thumbnail prior to the currently selected thumbnail), and then "speed up" as the event in content is moved away from (first, by selecting every second thumbnail prior to the currently selected thumbnail, then every third thumbnail from the currently selected thumbnail, and finally every fourth thumbnail from the currently selected thumbnail). In an aspect, an indication of an event can influence how the mosaic image is created. In an aspect, an indication of an event, such as a scene change can cause the time point of the plurality of thumbnails in the mosaic image to change. For example, a mosaic image can arrange the plurality of thumbnails so that, usually, a thumbnail representing content will be present for every three seconds of content. In the example, the mosaic image can arrange for a thumbnail representing content to be present every two and/or one second in response to an indication of a scene change. In another example, the mosaic image can arrange for a thumbnail representing every one second to be created for the ten second range (five seconds before and five seconds after) surrounding the event, for example, an indication of a scene change, and every two seconds for the six seconds before the ten second range and the six seconds after the ten second range. In an aspect, each selected thumbnail can be displayed in the thumbnail display 304 as the thumbnail is selected. In an aspect, each of the selected thumbnails can be assembled into an array of images and be displayed sequentially in the thumbnail display 304. In an aspect, each of the selected thumbnails can be combined as frames of a video, and the media player 120 can render the video in the thumbnail display 304.

In an aspect, information about a video, such as metadata, can allow breaks, such as chapters, to be known about the video and can allow for skipping between a plurality of thumbnails associated with a plurality of beginnings of a plurality of breaks. In an aspect, a break can be a scene change. In an aspect, a speed of a trick play command can speed up or slow down as a break is reached, as explained in the description of FIG. 3. In an aspect, a viewer can cause the video content to play at a time point associated with a currently displayed thumbnail. In an aspect, when the beginning of the mosaic image 400 is reached, one of a variety of outcomes can take place. For example, when the beginning of the mosaic image 400 is reached, the video content can play from the beginning of the video content. In another example, when the beginning of the mosaic image 400 is reached, the thumbnail display 304 can cycle back to the first thumbnail 432 and display the selected thumbnails again. In another example, when the beginning of the mosaic image 400 is reached, the video content can be displayed, starting at the time associated with the first selected thumbnail. In yet another example, when the beginning of the mosaic image 400 is reached, the video content can be displayed, resuming from the time in the video content when the trick play command was received. In another example, when the beginning of the mosaic image 400 is reached, the video content can stop displaying.

Figure 6:
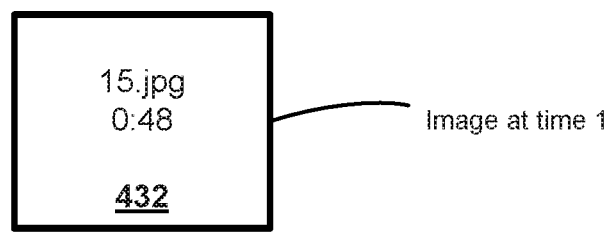
FIG. 6 is a diagram of an exemplary sequence of images associated with a trick play function.
Figure 6:
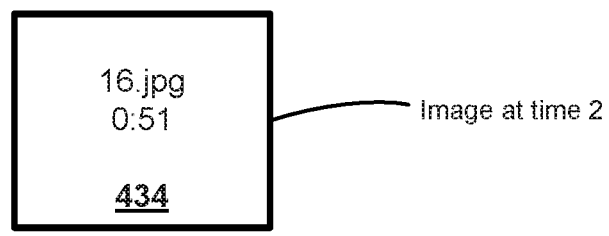
Figure 6:
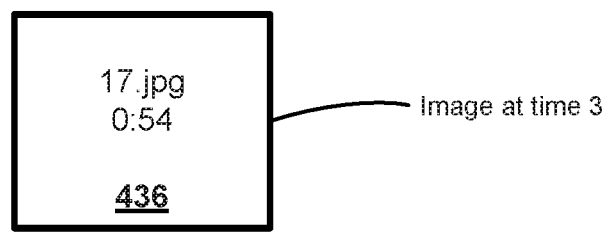

FIG. 6 illustrates an exemplary sequence of thumbnails to be presented in connection with a trick play command. In an aspect, the trick play command can indicate a desire to skip the video content forwards, such as a fast forward command. In response to receiving the trick play command, a series of thumbnails can be prepared for a preview. The series of thumbnails can begin with a first thumbnail 432 within the mosaic image 400. The first thumbnail 432 can be selected by determining a current time point in the displayed video content and determining a first thumbnail 432 based on the position of the first thumbnail 432 in the mosaic image 400. The position of the first thumbnail 432 in the mosaic image 400 can indicate a corresponding time point in the video content. For example, a viewer can activate a trick play command for skipping the video forwards 47 seconds into a video content. A selection can be made that the thumbnail 432, determined to be associated with 48 seconds into the video content, should be the first of a plurality of preview thumbnails. In another aspect, a determination can be made that a thumbnail should not be shown if the video content time point associated with the thumbnail has been shown.

Once the first thumbnail 432 is selected, the thumbnails to be subsequently displayed can be selected. In an aspect, in the event of a forwards trick play request, such as a fast forward request, the subsequently selected thumbnail can be a thumbnail that follows the currently selected thumbnail. In an aspect, the subsequently selected thumbnail can be the thumbnail that immediately follows the currently selected thumbnail in the mosaic image 400, such as thumbnail 434. In an aspect, the subsequently selected thumbnail can be a number of thumbnails after the currently selected thumbnail, wherein the number can increase as the viewer indicates a desire to increase the speed of the forwards trick play event. For example, the subsequently selected thumbnail can be one thumbnail after the currently selected thumbnail. In the example, if the viewer requests that the speed of the forwards trick play event be increased by twice as fast as the current speed, then the subsequently selected thumbnail can be two thumbnails after the currently selected thumbnail. In the example, if the viewer then requests that the speed of the forwards trick play event be increased by twice as fast as the increased speed, then the subsequently selected thumbnail can be four thumbnails after the currently selected thumbnail. In an aspect, the speed of the forwards trick play event can be changed by an indication of an event in the content, such as a change in scene. In an aspect, the indication of the event in the content can be given through metadata. In an aspect, the indication of the event in the content can be given by analyzing the content displayed. In an aspect, the speed of the forwards trick play event can be altered by changing the number of thumbnails after the currently selected thumbnail that the subsequently selected thumbnail is selected. For example, if a viewer has caused a trick play event to display the thumbnails such that the fourth thumbnail after the currently selected thumbnail is the subsequently selected thumbnail, in response to detecting an event in content, such as a scene change, the trick play event can "slow down" by selecting the third, second, and/or every thumbnail after the currently selected thumbnail. In an example, the trick play event can "slow down" as the event in content is approached, (first, by selecting every third thumbnail after the currently selected thumbnail, then every second thumbnail after the then currently selected thumbnail, and finally every thumbnail after the then currently selected thumbnail), and then "speed up" as the event in content is moved away from (first, by selecting every second thumbnail after the currently selected thumbnail, then every third thumbnail after the currently selected thumbnail, and finally every fourth thumbnail after the currently selected thumbnail). In an aspect, an indication of an event can influence how the mosaic image is created. In an aspect, an indication of an event, such as a scene change, can cause the time point of the plurality of thumbnails in the mosaic image to change. For example, a mosaic image can arrange the plurality of thumbnails so that, usually, a thumbnail representing content will be present for every three seconds of content. In the example, the mosaic image can arrange for a thumbnail representing content to be presented every two and/or one second in response to an indication of a scene change. In another example, the mosaic image can arrange for a thumbnail representing every one second to be created for the ten second range (five seconds before and five seconds after) surrounding the event, for example, an indication of a scene change, and every two seconds for the six seconds before the ten second range and the six seconds after the ten second range. In an aspect, each selected thumbnail can be displayed in the thumbnail display 304 as the thumbnail is selected. In an aspect, each of the selected thumbnails can be assembled into an array of images and be displayed sequentially in the thumbnail display 304. In an aspect, each of the selected thumbnails can be combined as frames of a video, and the media player 120 can render the video in the thumbnail display 304.

In an aspect, information about video content, such as metadata, can allow breaks, such as chapters, to be known about the video content and can allow for skipping between a plurality of thumbnails associated with a plurality of beginnings of a plurality of breaks. In an aspect, a break can be a scene change. In an aspect, a speed of a trick play command can speed up or slow down as a break is reached, as explained in the description of FIG. 3. In an aspect, a viewer can cause the video content to play at a time point associated with a currently displayed thumbnail. In an aspect, when the end of the mosaic image 400 is reached, one of a variety of outcomes can take place. For example, when the end of the mosaic image 400 is reached, the video content can play from the beginning. In another example, when the end of the mosaic image 400 is reached, the thumbnail display 304 can cycle back to the first thumbnail 432 and display the selected thumbnails again. In another example, when the end of the mosaic image 400 is reached, the video content can be displayed, starting at the time associated with the first selected thumbnail. In yet another example, when the end of the mosaic image 400 is reached, the video content can be displayed, resuming from the time in the video content when the trick play command was received. In another example, when the end of the mosaic image 400 is reached, the video content can stop displaying.

In one aspect, a plurality of mosaic files associated with the video content can be transmitted from a remote computing device 104 through a network 105 to a user device 102 comprising the media player 120. In an aspect, a mosaic file can comprise a mosaic image. In an aspect, a video can be created using a plurality of thumbnails from a single mosaic image, as explained above. In an aspect, a video can be created using a plurality of thumbnails from multiple mosaic files, using the techniques described above. For example, a first mosaic image can comprise a thumbnail every three seconds, a second mosaic image can comprise a thumbnail every two seconds, and a third mosaic image can comprise a thumbnail every second. In the example, a video created in response to a trick play command can be created by taking thumbnails from the first mosaic image for the corresponding video content, except that thumbnails from the third mosaic image are used for the ten second windows of five seconds before and after a scene change and thumbnails from the second mosaic image are used for the six seconds before the ten second window and six seconds after the ten second window.

Figure 7:
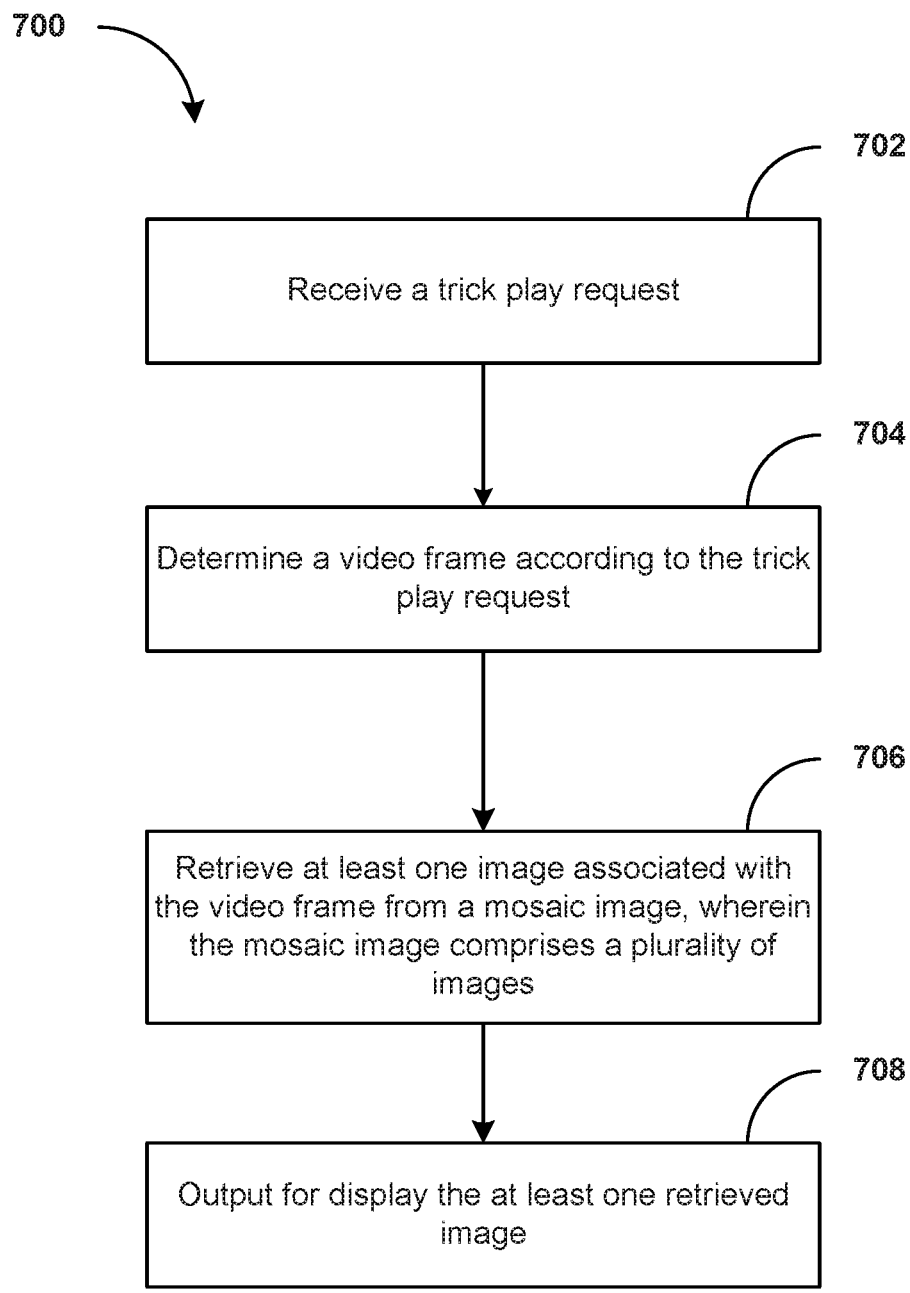
FIG. 7 is a flow chart of an exemplary method.

FIG. 7 is a flowchart illustrating an example method 700. At 702, a trick play request can be received. In an aspect, the request can be received at a user device 102 from a viewer. In an aspect, the request can be received at a media player 120 of the user device 102. In an aspect, the request can be entered on a second user device (not pictured) and transmitted to the user device 102. In a further aspect, the second user device can be a remote control, smart phone, tablet, or any other device capable of receiving input from the viewer and transmitting the input to the user device 102. In an aspect, the second user device can communicate with the user device 102 using any method, including radio frequency communication.

A video frame can be determined according to the trick play request at 704. In one aspect, determining a video frame according to the trick play request can comprise determining a timespan associated with the trick play request. In an aspect, the determined video frame can be based on the time point within content when the trick play request was received. In an aspect, the time point within the content can be determined by metadata.

At 706, at least one image associated with the video frame can be retrieved from a mosaic image. The mosaic image can comprise a plurality of images. In one aspect, retrieving the at least one image associated with the video frame from the mosaic image can comprise determining an image in the mosaic image closest in time to the determined video frame. In yet a further aspect, retrieving the at least one image associated with the video frame from the mosaic image can comprise locating the determined image in the mosaic image. In an aspect, as explained in reference to FIGS. 5 and 6, the image associated with the video frame can be based on the trick play request (e.g., if the trick play is a backwards request, the identified video frame cannot be, in some aspects, a frame that has not played in the content yet). FIGS. 4, 5, and 6, described in detail above, show examples of retrieving an image from a mosaic image.

At 708, the at least one retrieved image can be outputted for display. In an aspect, outputting for display the at least one retrieved image can comprise providing the at least one retrieved image for display in the same format as the at least one image was when the at least one image was retrieved. In another aspect, outputting for display the at least one retrieved image can comprise encoding the at least one retrieved image as video, and then the video comprising the at least one retrieved image can be provided for display. In an aspect, the video can be created using a plurality of thumbnails from a single mosaic image, as explained above. In an aspect, the video can be created using a plurality of thumbnails from multiple mosaic files, using the techniques described above. For example, a first mosaic image can comprise a thumbnail every three seconds, a second mosaic image can comprise a thumbnail every two seconds, and a third mosaic image can comprise a thumbnail every second. In the example, the video created in response to a trick play command can be created by taking thumbnails from the first mosaic image for the corresponding video content, except that thumbnails from the third mosaic image are used for the ten second windows of five seconds before and after a scene change and thumbnails from the second mosaic image are used for the six seconds before the ten second window and six seconds after the ten second window.

In an aspect, at least a portion of the plurality of images can be retrieved from the mosaic image in a logical temporal sequence starting with the retrieved image. At least a portion of the plurality of images can be provided as a video according to the logical temporal sequence. In another aspect, the mosaic image can be associated with metadata. The metadata can comprise one or more of: time points, heights, widths, time intervals, and identifiers related to one or more of the plurality of images. In a further aspect, the metadata can be stored in any format, such as JavaScript Object Notation (JSON) format, for example. Furthermore, the mosaic image can comprise a JSON object. Furthermore, a JSON object can comprise the mosaic image.

In an aspect, the trick play request can comprise one or more of a fast forward request, a rewind request, a fast rewind request, a slow motion request, a speed-specified fast forward request, a speed-specified rewind request, and a speed-specified slow motion request. In yet another aspect, each of the plurality of images can be stored in a plurality of sizes. In some aspects, each of the plurality of images can be stored in a plurality of resolutions.

Figure 8:
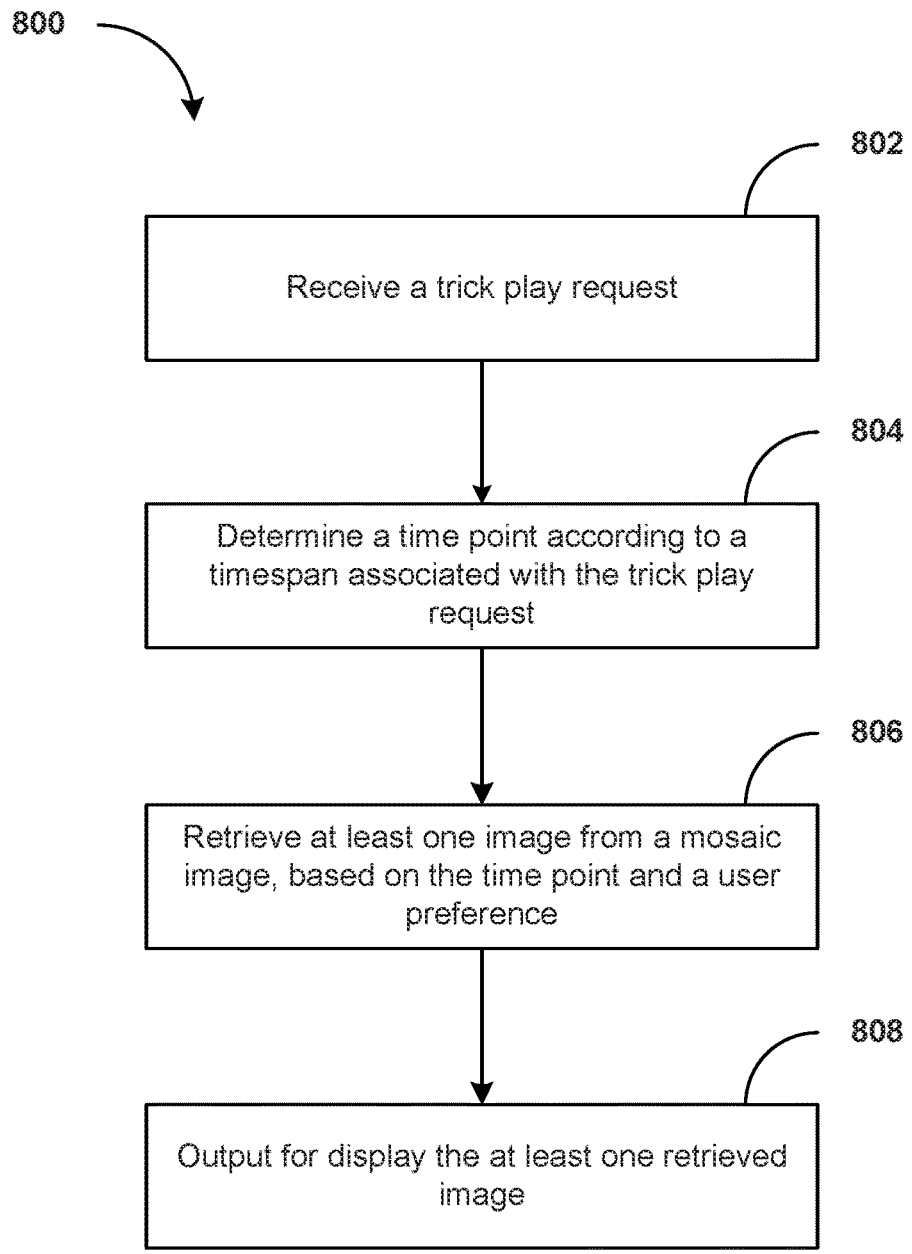
FIG. 8 is a flow chart of an exemplary method.

FIG. 8 is a flowchart illustrating an example method 800. At 802, a trick play request can be received. In an aspect, the request can be received at a user device 102 from a viewer. In an aspect, the request can be received at a media player 120 of the user device 102. In an aspect, the request can be entered on a second user device (not pictured) and transmitted to the user device 102. In a further aspect, the second user device can be a remote control, smart phone, tablet, or any other device capable of receiving input from the viewer and transmitting the input to the user device 102. In an aspect, the second user device can communicate with the user device 102 using any method, including radio frequency communication.

At 804, a time point can be determined according to a timespan associated with the trick play request. In one aspect, determining a time point according to a timespan associated with the trick play request can be based on the time point within content when the trick play request was received. In an aspect, the time point within the content can be determined by metadata.

At 806, at least one image can be retrieved from a mosaic image, based on the time point and a user preference. In an aspect, retrieving the at least one image can comprise retrieving a plurality of images from the mosaic image in a logical temporal sequence starting with the retrieved image. In an aspect, the mosaic image can be associated with metadata, wherein the metadata can comprise one or more of: time points, heights, widths, time intervals, and identifiers related to the plurality of images in the mosaic image. The mosaic image can comprise a plurality of images. In one aspect, retrieving the at least one image from a mosaic image can comprise determining an image closest in time to the determined time point. In yet a further aspect, retrieving at least one image from the mosaic image can comprise locating an image in the mosaic image. In one aspect, the user preference can comprise one or more of an image size, image resolution, color depth, sharpening filter, image format, and any other image attribute. In an aspect, the user preference can be determined by feedback from a viewer. In an aspect, the user preference can be determined by attributes of the content. For example, if the content is in high definition, then a user preference can be for high definition. In an aspect, as explained in reference to FIGS. 5 and 6, the image associated with the video frame can be based on the trick play request (e.g., if the trick play is a backwards request, the identified video frame cannot be, in some aspects, a frame that has not played in the content yet). FIGS. 4, 5, and 6, described in detail above, show examples of retrieving an image from a mosaic image.

At 808, the at least one retrieved image can be outputted for display. In an aspect, outputting for display the at least one retrieved image can comprise outputting the plurality of images as a video according to the logical temporal sequence. In an aspect, outputting for display the at least one retrieved image can comprise providing the at least one retrieved image for display in the same format as the at least one image was when the at least one image was retrieved. In another aspect, outputting for display the at least one retrieved image can comprise encoding the at least one retrieved image as video, and then the video comprising the at least one retrieved image can be provided for display. In an aspect, the video can be created using a plurality of thumbnails from a single mosaic image, as explained above. In an aspect, the video can be created using a plurality of thumbnails from multiple mosaic files, using the techniques described above. For example, a first mosaic image can comprise a thumbnail every three seconds, a second mosaic image can comprise a thumbnail every two seconds, and a third mosaic image can comprise a thumbnail every second. In the example, the video created in response to a trick play command can be created by taking thumbnails from the first mosaic image for the corresponding video content, except that thumbnails from the third mosaic image are used for the ten second windows of five seconds before and after a scene change and thumbnails from the second mosaic image are used for the six seconds before the ten second window and six seconds after the ten second window.

In an aspect, the mosaic image can comprise a plurality of images. In an aspect, each of the plurality of images can have an associated time point. In an aspect, retrieving an image from a mosaic image can comprise determining an image wherein the time point associated with the received image is closer to the determined time point than the time points associated with the other of the plurality of images according to the timespan associated with the trick play request.

Figure 9:
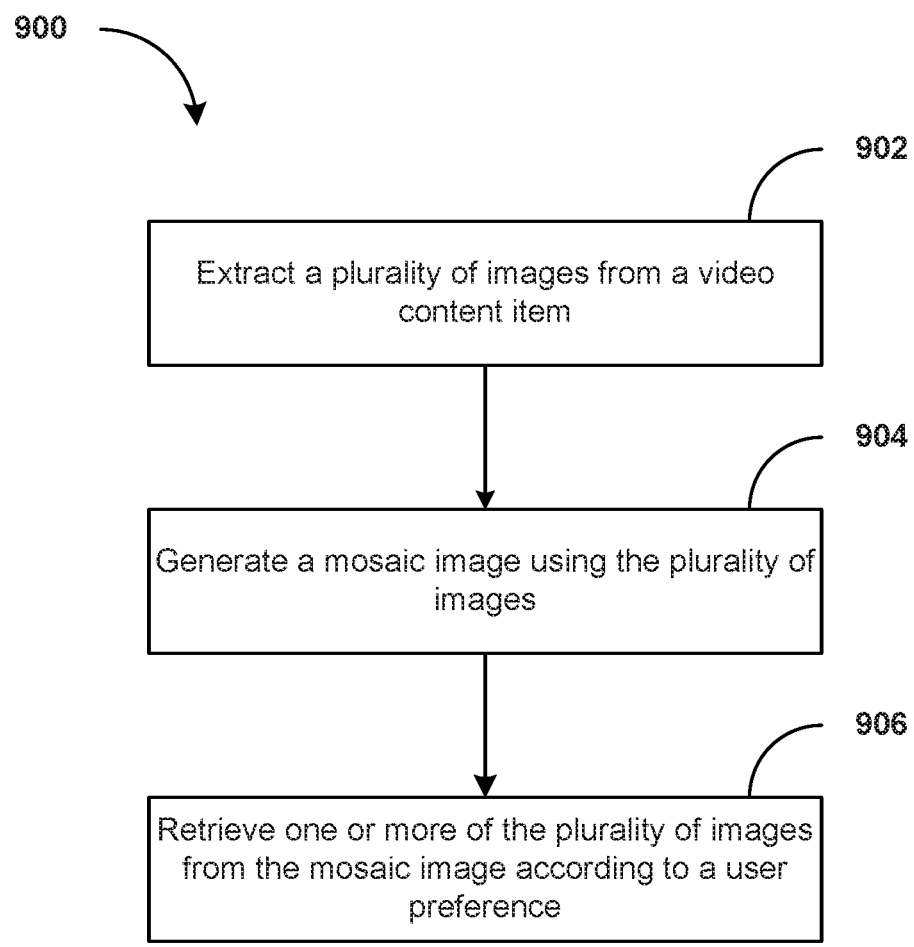
FIG. 9 is a flow chart of an exemplary method.

FIG. 9 is a flowchart illustrating an example method 900. At 902, a plurality of images can be extracted from a video content item. In one aspect, the plurality of images can be comprised of a plurality of thumbnail images with one or more of a specified size and a specified resolution. In an aspect, each extracted image can be associated with a time point in the video content item. In an aspect, the time point can be determined by metadata associated with the video content item.

At 904, a mosaic image can be generated using the plurality of images. In an aspect, the mosaic image can be associated with metadata, wherein the metadata can comprise one or more of: time points, heights, widths, time intervals, and identifiers related to the plurality of images in the mosaic image. In an aspect, the mosaic image can be an array of images. In an aspect, the mosaic image can be a multidimensional array of images. In an aspect, the mosaic image can comprise a Joint Photographic Experts Group (JPEG) format, a Portable Network Graphics (PNG) format, or any other type of image format. In an aspect, the metadata can help match a time point within content with one of the plurality of images within the mosaic image. FIG. 4 (above) describes examples of how a position of one of the plurality of images within the mosaic image relates to the image's associated time point within the content. In an aspect, the mosaic image can comprise layers. In an aspect, each frame represented in the mosaic image can comprise multiple layers. In an aspect, each layer of a frame can represent a different quality, such as a different resolution. For example, an image within the mosaic image associated with the frame at time point 48 seconds into the content can comprise two layers: a first layer corresponding to standard definition and a second layer corresponding to high definition. In another aspect, the mosaic image can comprise a plurality of layers, wherein each layer comprises a single one of the plurality of images within the mosaic image. For example, each layer of the mosaic image can correspond to a time point within the content and comprise a corresponding one of the plurality of images within the mosaic image.

At 906, one or more of the plurality of images can be retrieved from the mosaic image according to a user preference. In an aspect, the mosaic image can be associated with metadata, wherein the metadata can comprise one or more of: time points, heights, widths, time intervals, and identifiers related to the plurality of images in the mosaic image. The mosaic image can comprise a plurality of images. In one aspect, retrieving an image associated with the video frame from a mosaic image can comprise determining an image closest to the identified video frame in time. In yet a further aspect, retrieving an image associated with the video frame from a mosaic image can comprise locating the determined image in the mosaic image. In an aspect, as explained in reference to FIGS. 5 and 6, the image associated with the video frame can be based on the trick play request (e.g., if the trick play is a backwards request, the identified video frame cannot be, in some aspects, a frame that has not played in the content yet). FIGS. 4, 5, and 6, described in detail above, show examples of retrieving an image from a mosaic image. In an aspect, the user preference can be determined by feedback from a viewer. In an aspect, the user preference can be determined by attributes of the content. For example, if the content is in high definition, then a user preference can be for high definition. In an aspect, the user preference can comprise one or more of size, resolution and location related to the retrieved one or more of the plurality of images. In another aspect, the retrieved plurality of images can be provided as a video stream.

Figure 10:
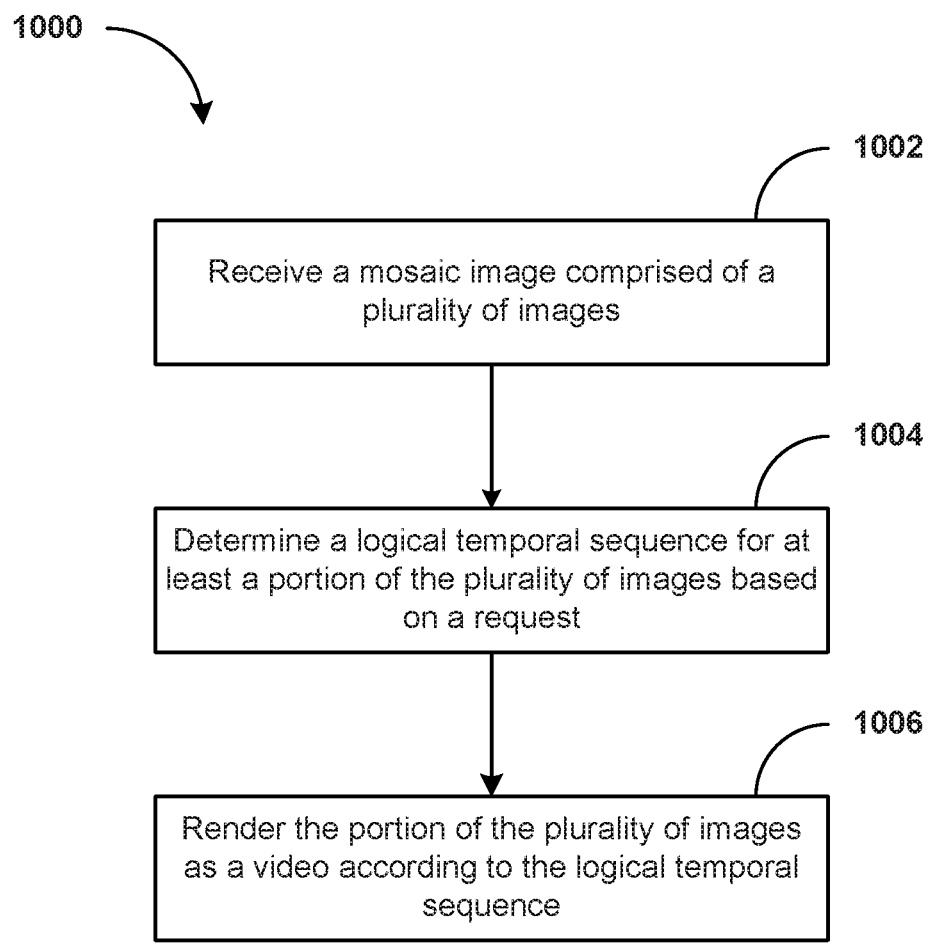
FIG. 10 is a flow chart of an exemplary method.

FIG. 10 is a flowchart illustrating an example method 1000. At 1002, a mosaic image comprised of a plurality of images can be received. In one aspect, the mosaic image can be associated with metadata, wherein the metadata can comprise one or more of: time points, heights, widths, time intervals, and identifiers related to the plurality of images in the mosaic image. In another aspect, the plurality of images can be extracted from a video content item at a predefined time interval. As described above, FIG. 4 provides examples regarding a mosaic image comprised of a plurality of images.

At 1004, a logical temporal sequence can be determined for at least a portion of the plurality of images based on a request. In an aspect, the request can be received at a user device 102 from a viewer. In an aspect, the request can be received at a media player 120 of the user device 102. In an aspect, the request can be entered on a second user device (not pictured) and transmitted to the user device 102. In a further aspect, the second user device can be a remote control, smart phone, tablet, or any other device capable of receiving input from the viewer and transmitting the input to the user device 102. In an aspect, the second user device can communicate with the user device 102 using any method, including radio frequency communication. In one aspect, the logical temporal sequence for the at least a portion of the plurality of images can be determined based on the metadata. In an aspect, the request can comprise a trick play request. For example, if the trick play request is a backwards trick play request, then the logical temporal sequence can be backwards. FIGS. 5 and 6, described in detail above, show examples of determining a logical temporal sequence for at least a portion of the plurality of images.

At 1006, the portion of the plurality of images can be rendered as a video according to the logical temporal sequence. In another aspect, a plurality of images can be retrieved and encoded as video, and then the video comprising the retrieved images can be provided for display. In an aspect, the video can be created using a plurality of thumbnails from a single mosaic image, as explained above. In an aspect, the video can be created using a plurality of thumbnails from multiple mosaic files, using the techniques described above. For example, a first mosaic image can comprise a thumbnail for every three seconds, a second mosaic image can comprise a thumbnail for every two seconds, and a third mosaic image can comprise a thumbnail for every second. In the example, the video created in response to a trick play command can be created by taking thumbnails from the first mosaic image for the corresponding video content, except that thumbnails from the third mosaic image are used for the ten second windows of five seconds before and after a scene change and thumbnails from the second mosaic image are used for the six seconds before the ten second window and six seconds after the ten second window.

Figure 11:
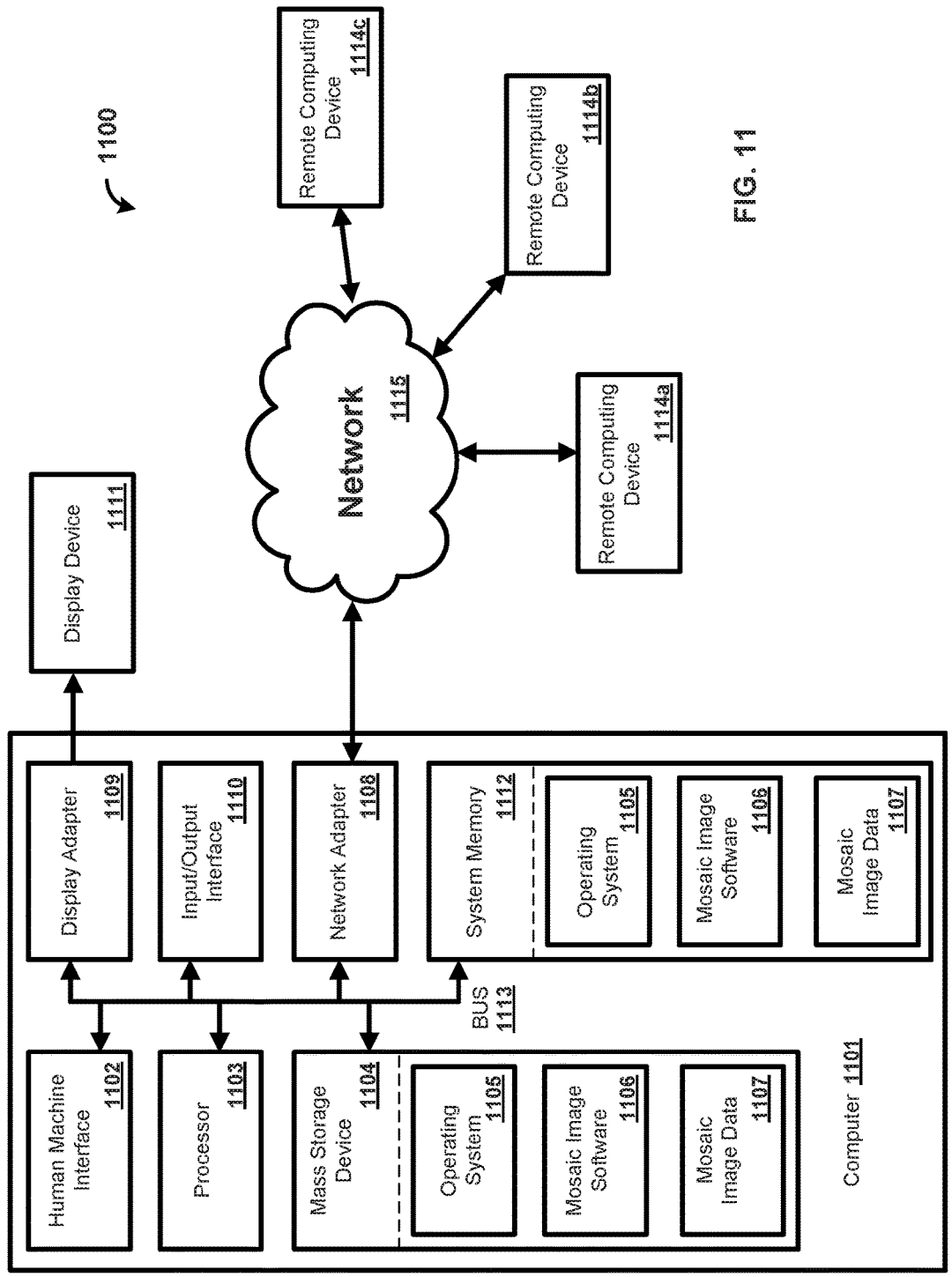
FIG. 11 is a block diagram of an exemplary computing device.

In an exemplary aspect, the methods and systems can be implemented on a computer 1101 as illustrated in FIG. 11 and described below. By way of example, user device 102 and/or computing device 104 of FIG. 1 can be a computer 1101 as illustrated in FIG. 11. Similarly, the methods and systems disclosed can utilize one or more computers to perform one or more functions in one or more locations. FIG. 11 is a block diagram illustrating an exemplary operating environment 1100 for performing the disclosed methods. This exemplary operating environment 1100 is only an example of an operating environment and is not intended to suggest any limitation as to the scope of use or functionality of operating environment architecture. Neither should the operating environment 1100 be interpreted as having any dependency or requirement relating to any one or combination of components illustrated in the exemplary operating environment 1100.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, and/or the like that perform particular tasks or implement particular abstract data types. The disclosed methods can also be practiced in grid-based and distributed computing environments where tasks are performed by remote processing devices that are linked through a communications network. In a distributed computing environment, program modules can be located in local and/or remote computer storage media including memory storage devices.

Further, one skilled in the art will appreciate that the systems and methods disclosed herein can be implemented via a general-purpose computing device in the form of a computer 1101. The computer 1101 can comprise one or more components, such as one or more processors 1103, a system memory 1112, and a bus 1113 that couples various components of the computer 1101 including the one or more processors 1103 to the system memory 1112. In the case of multiple processors 1103, the system can utilize parallel computing.

The bus 1113 can comprise one or more of several possible types of bus structures, such as a memory bus, memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 1113, and all buses specified in this description can also be implemented over a wired or wireless network connection and one or more of the components of the computer 1101, such as the one or more processors 1103, a mass storage device 1104, an operating system 1105, mosaic image software 1106, mosaic image data 1107, a network adapter 1108, system memory 1112, an Input/Output Interface 1110, a display adapter 1109, a display device 1111, and a human machine interface 1102, can be contained within one or more remote computing devices 1114a,b,c at physically separate locations, connected through buses of this form, in effect implementing a fully distributed system.

The computer 1101 typically comprises a variety of computer readable media. Exemplary readable media can be any available media that is accessible by the computer 1101 and comprises, for example and not meant to be limiting, both volatile and non-volatile media, removable and non-removable media. The system memory 1112 can comprise computer readable media in the form of volatile memory, such as random access memory (RAM), and/or non-volatile memory, such as read only memory (ROM). The system memory 1112 typically can comprise data such as mosaic image data 1107 and/or program modules such as operating system 1105 and mosaic image software 1106 that are accessible to and/or are operated on by the one or more processors 1103.

In another aspect, the computer 1101 can also comprise other removable/non-removable, volatile/non-volatile computer storage media. The mass storage device 1104 can provide non-volatile storage of computer code, computer readable instructions, data structures, program modules, and other data for the computer 1101. For example, a mass storage device 1104 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 1104, including by way of example, an operating system 1105 and mosaic image software 1106. One or more of the operating system 1105 and mosaic image software 1106 (or some combination thereof) can comprise elements of the programming and the mosaic image software 1106. Mosaic image data 1107 can also be stored on the mass storage device 1104. Mosaic image data 1107 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple locations within the network 1115.

In another aspect, the user can enter commands and information into the computer 1101 via an input device (not shown). Examples of such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices can be connected to the one or more processors 1103 via a human machine interface 1102 that is coupled to the bus 1113, but can be connected by other interface and bus structures, such as a parallel port, game port, an IEEE 1394 Port (also known as a Firewire port), a serial port, network adapter 1108, and/or a universal serial bus (USB).

In yet another aspect, a display device 1111 can also be connected to the bus 1113 via an interface, such as a display adapter 1109. It is contemplated that the computer 1101 can have more than one display adapter 1109 and the computer 1101 can have more than one display device 1111. For example, a display device 1111 can be a monitor, an LCD (Liquid Crystal Display), light emitting diode (LED) display, television, smart lens, smart glass, and/or a projector. In addition to the display device 1111, other output peripheral devices can comprise components such as speakers (not shown) and a printer (not shown) which can be connected to the computer 1101 via Input/Output Interface 1110. Any step and/or result of the methods can be output in any form to an output device. Such output can be any form of visual representation, including, but not limited to, textual, graphical, animation, audio, tactile, and the like. The display 1111 and computer 1101 can be part of one device, or separate devices.

The computer 1101 can operate in a networked environment using logical connections to one or more remote computing devices 1114a,b,c. By way of example, a remote computing device 1114a,b,c can be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computer 1101 and a remote computing device 1114a,b,c can be made via a network 1115, such as a local area network (LAN) and/or a general wide area network (WAN). Such network connections can be through a network adapter 1108. A network adapter 1108 can be implemented in both wired and wireless environments. Such networking environments are conventional and commonplace in dwellings, offices, enterprise-wide computer networks, intranets, and the Internet.

For purposes of illustration, application programs and other executable program components such as the operating system 1105 are illustrated herein as discrete blocks, although it is recognized that such programs and components can reside at various times in different storage components of the computing device 1101, and are executed by the one or more processors 1103 of the computer 1101. An implementation of mosaic image software 1106 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" can comprise volatile and non-volatile, removable and non-removable media implemented in any methods or technology for storage of information such as computer readable instructions, data structures, program modules, or other data. Exemplary computer storage media can comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. An apparatus comprising:
   one or more processors; and
   memory storing processor executable instructions that, when executed by the one or more processors, cause the apparatus to:
   receive a trick play request indicative of a trick play speed;
   determine a first video frame based on a first time point associated with the trick play request;
   determine, from a mosaic image comprising a plurality of images associated with corresponding time points, at least one first image of the plurality of images associated with the first video frame;
   determine, based on the trick play speed and the first time point, a second video frame corresponding to a second time point;
   determine, from the mosaic image at least one second image of the plurality of images associated with the second video frame;
   encode at least the at least one first image and the at least one second image as a video stream; and
   cause an output of the video stream.

2. The apparatus of claim 1, wherein:
   the processor executable instructions that, when executed by the one or more processors, cause the apparatus to determine, from the mosaic image comprising the plurality of images associated with the corresponding time points, the at least one first image further cause the apparatus to determine at least a portion of the plurality of images in a logical temporal sequence starting with the at least one first image; and
   the processor executable instructions that, when executed by the one or more processors, cause the apparatus to encode the at least one first image and the at least one second image as a video stream further cause the apparatus to encode, according to the logical temporal sequence, the at least one first image and the at least one second image as the video stream according to the logical temporal sequence.

3. The apparatus of claim 1, wherein the mosaic image is associated with metadata comprising one or more of: time points related to one or more images of the plurality of images, or time intervals related to the one or more images of the plurality of images.

4. The apparatus of claim 1, wherein the processor executable instructions that, when executed by the one or more processors, cause the apparatus to determine the first video frame based on the first time point further cause the apparatus to determine, based on a timespan associated with the trick play request, the first video frame.

5. The apparatus of claim 1, wherein the processor executable instructions that, when executed by the one or more processors, cause the apparatus to determine, from the mosaic image comprising the plurality of images associated with the corresponding time points, the at least one first image further cause the apparatus to determine an image in the mosaic image with an associated time point closest in time to the first time point.

6. The apparatus of claim 1, wherein the trick play request comprises one or more of:
   a fast forward request, a rewind request, or a slow motion request.

7. The apparatus of claim 1, wherein each of the plurality of images is stored in one or more of a plurality of sizes or a plurality of resolutions.

8. An apparatus comprising:
   one or more processors; and
   memory storing processor executable instructions that, when executed by the one or more processors, cause the apparatus to:
   receive a trick play request indicative of a trick play speed;
   determine a first time point according to a timespan associated with the trick play request;
   determine, from a mosaic image comprising a plurality of images associated with corresponding time points, based on the first time point, at least one first image;
   determine a second time point according to the timespan based on the trick play speed and the first time point;
   determine, from the mosaic image, based on the second time point, at least one second image;

encode at least the at least one first image and the at least one second image as a video stream; and
cause an output of the video stream.

9. The apparatus of claim 8, wherein:
the processor executable instructions that, when executed by the one or more processors, cause the apparatus to determine, from the mosaic image comprising the plurality of images associated with the corresponding time points, based on the first time point, the at least one first image further cause the apparatus to determine the plurality of images in a logical temporal sequence starting with the at least one first image; and
the processor executable instructions that, when executed by the one or more processors, cause the apparatus to encode the at least one first image and the at least one second image as a video stream further cause the apparatus to encode, according to the logical temporal sequence, the at least one first image and the at least one second image as the video stream.

10. The apparatus of claim 8, wherein the processor executable instructions that, when executed by the one or more processors, cause the apparatus to determine, from the mosaic image comprising the plurality of images associated with the corresponding time points, based on the first time point, the at least one first image further cause the apparatus to determine, based on a user preference, the at least one first image, wherein the user preference comprises one or more of: image size, image resolution, or image format.

11. The apparatus of claim 8, wherein the mosaic image is associated with metadata that comprises one or more of: heights or widths related to the plurality of images in the mosaic image.

12. The apparatus of claim 8, wherein the processor executable instructions that, when executed by the one or more processors, cause the apparatus to determine, from the mosaic image comprising the plurality of images associated with the corresponding time points, based on the first time point, the at least one first image further cause the apparatus to determine an image with an associated time point closest in time to the first time point according to the timespan.

13. A system, comprising:
a user device configured to send a trick play request indicative of a trick play speed; and
at least one computing device configured to at least:
receive, from the user device, the trick play request indicative of the trick play speed;
determine a first video frame based on a first time point associated with the trick play request;
determine, from a mosaic image comprising a plurality of images associated with corresponding time points, at least one first image of the plurality of images associated with the first video frame;
determine, based on the trick play speed and the first time point, a second video frame corresponding to a second time point;
determine, from the mosaic image at least one second image of the plurality of images associated with the second video frame;
encode the at least one first image and the at least one second image as a video stream;
cause an output of the video stream to the user device; and
wherein, the user device is configured to receive the output of the video stream from the at least one computing device.

14. The system of claim 13, wherein:
to determine, from a mosaic image comprising a plurality of images associated with corresponding time points, at least one first image of the plurality of images, the at least one computing device is configured to determine at least a portion of the plurality of images associated with corresponding time points in a logical temporal sequence starting with the at least one first image; and
to encode the at least one first image and the at least one second image as a video stream the at least one computing device is configured to encode, according to the logical temporal sequence, the at least one first image and the at least one second image as the video stream.

15. The system of claim 13, wherein the mosaic image is associated with metadata comprising one or more of: time points related to one or more images of the plurality of images, or time intervals related to the one or more images of the plurality of images.

16. The system of claim 13, wherein, to determine the first video frame based on the first time point associated with the trick play request, the at least one computing device is configured to determine, based on a timespan associated with the trick play request, the first video frame.

17. The system of claim 13, wherein, to determine, from the mosaic image comprising the plurality of images associated with the corresponding time points, the at least one first image associated with the first video frame, the at least one computing device is configured to determine an image in the mosaic image with an associated time point closest in time to the first time point.

18. The system of claim 13, wherein the trick play request comprises one or more of: a fast forward request, a rewind request, or a slow motion request.

19. The system of claim 13, wherein each of the plurality of images is stored in a plurality of sizes or a plurality of resolutions.

20. A system comprising:
a user device, configured to send a trick play request indicative of a trick play speed; and
at least one computing device configured to at least:
receive, from the user device, the trick play request indicative of the trick play speed;
determine a first time point according to a timespan associated with the trick play request;
determine, from a mosaic image comprising a plurality of images associated with corresponding time points, based on the first time point, at least one first image;
determine a second time point according to the timespan based on the trick play speed and the first time point;
determine, from the mosaic image, based on the second time point, at least one second image;
encode at least the at least one first image and the at least one second image as a video stream;
cause an output of the video stream to the user device; and
wherein the user device is configured to receive the output of the video stream from the at least one computing device.

21. The system of claim 20, wherein:
to determine, from the mosaic image comprising the plurality of images associated with corresponding time points, based on the first time point, at least one first image, the at least one computing device is configured to determine the plurality of images in a logical temporal sequence starting with the at least one first image; and to encode the at least one first image and the at least one second image as the video stream, the at least one computing device is configured to encode, according to the logical temporal sequence, the at least one first image and the at least one second image as the video stream.

22. The system of claim 20, wherein to determine, from the mosaic image comprising the plurality of images associated with corresponding time points, based on the first time point, at least one first image, the at least one computing device is configured to determine, based on a user preference, the at least one first image, wherein the user preference comprises one or more of: image size, image resolution, or image format.

23. The system of claim 20, wherein the mosaic image is associated with metadata that comprises one or more of: heights or widths related to the plurality of images in the mosaic image.

24. The system of claim 20, wherein to determine, from the mosaic image comprising the plurality of images associated with corresponding time points, based on the first time point, at least one first image, the at least one computing device is configured to determine an image with an associated time point closest in time to the first time point according to the timespan associated with the trick play request.

* * * * *